Nov. 28, 1950    M. G. HOFFMAN    2,531,570
NURSING DEVICE
Filed March 23, 1949

Inventor
MABERT G. HOFFMAN,

By Lloyd P. Clark
Attorney

Patented Nov. 28, 1950

2,531,570

UNITED STATES PATENT OFFICE 2,531,570

NURSING DEVICE

Mabert G. Hoffman, Thurmont, Md.

Application March 23, 1949, Serial No. 83,080

2 Claims. (Cl. 215—11)

The present invention relates to nursing devices and more particularly pertains to a container which is adapted to receive a suitably compounded liquid for an infant which is maintained in a sterile condition including the nipple during handling and transportation of such containers.

It has been the practice in feeding small children and particularly an infant to prepare the formula and introduce such liquid into a bottle or suitable container. The bottles as a group are then stored in a refrigerator or the like and a nipple is applied to one container which is then heated and contents are fed to the infant through the nipple.

In contrast to such a practice an object of the present invention is to provide a sterile container which may be supplied with a suitable liquid food for infants and which is closed by a sterile nipple with the formula and the container and nipple maintained in a sterile condition during shipment and handling by a protective hood so that the contents of the container are available for consumption in an entirely hygienic condition merely by heating and removing the hood.

A still further object of the invention is to provide means for closing the open mouth of a nursing bottle or similar container with a nipple which may be inverted or collapsed into the container mouth thereby adapting the device for receiving a detachable hood for maintaining the nipple and the associated portion of the bottle in a sterile condition.

Other objects and features of the invention will be more apparent as the present disclosure proceeds and upon consideration of the accompanying drawing and the following detailed description wherein an exemplary embodiment of the invention is disclosed.

Figure 1:
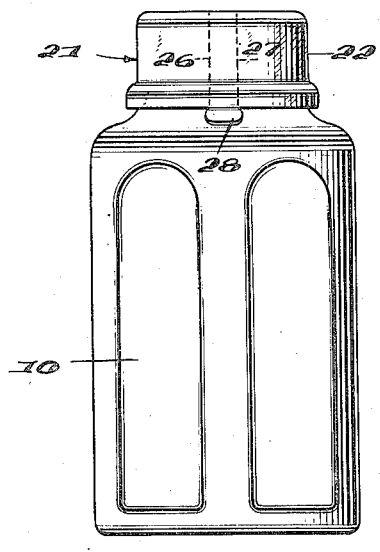
Fig. 1 is an elevational view showing a nursing bottle closure arrangement exhibiting the invention.

This invention is directed to a nursing device which is adapted to receive a suitably compounded formula which may include distilled water, sterile evaporated milk to which has been added suitable minerals and vitamines in the proportion suitable for the food requirements of an infant or a group of children. Any suitable proportion of milk and other food elements may be introduced into the sterile bottle or container by a dairy or like food processing establishment and the container is adapted to be closed by a nipple in an entirely sterile manner. The invention includes means covering the neck of the container for maintaining the nipple and an associated portion of the bottle in a sterile condition so that the containers and the formula therein may be marketed and delivered through ordinary commercial channels to hospitals or homes or places for consumption by children. The containers may then be heated and the protective hood removed so that an infant may consume the contents of the containers with the assurance that the food is entirely sterile.

Referring to the drawing there is shown at 10 a container which may be formed to any desired shape and may also be manufactured from any well-known materials. In the embodiment illustrated in the drawing, the container is formed of glass and is provided with a neck portion 11. The open mouth provided in the neck permits liquid food ingredient to be introduced into the container after the bottle has been properly sterilized.

The neck portion 11 of the bottle carries an annular bead 14 which is adapted to receive the skirt of a nipple shown at 16. The nipple may be formed of any suitable elastic material such as rubber or synthetic compounds having the characteristics of rubber. The skirt of the nipple is shown at 17 and is adapted to embrace the annular bead 14 so that the nipple is retained in place closing the mouth of the bottle neck. The annular bead 14 is of smaller diameter than the peripheral portion 18 of the bottle neck. It will be understood that the nipple 16 is thoroughly sterilized before being placed over the mouth of the container.

Figure 2:
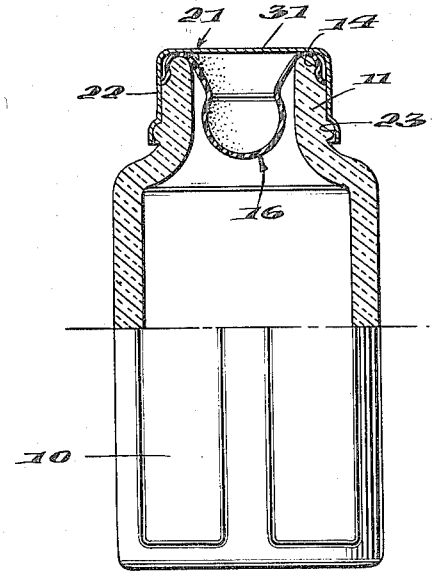
Fig. 2 is a partial sectional view taken through the neck of the container.

In order to preserve the sterile condition of the nipple and contents of the bottle a hood shown at 21 is arranged over the neck portion of the bottle as shown in Figs. 1 and 2. The hood 21 may be formed of relatively thin sheet material such as metal, plastic or even impregnated cardboard. The hood 21 includes a skirt portion 22 which is provided with an inner diameter greater than the periphery of the skirt 17 of the nipple when in position over the annular bead 14. The skirt 22 is adapted to be crimped or otherwise shaped around a further bead 23 carried on the exterior of the bottle neck 11. The nipple 16 is inverted or collapsed into the neck of the bottle as shown in Fig. 2, prior to the application of the hood 21. It will be understood that the hood is also sterilized before being applied to the bottle neck.

Figure 3:
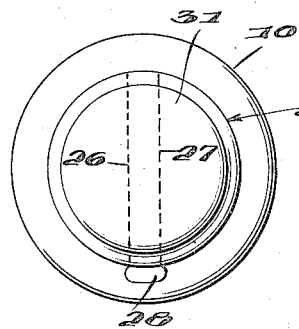
Fig. 3 is a plan view.
Figure 4:
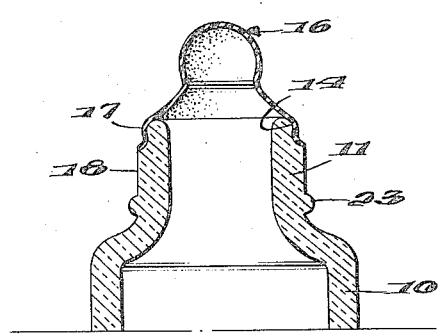
Fig. 4 is a sectional view showing the hood removed and the nipple in an extended position.

The hood 21 is provided with score lines 26 and 27 which extend axially along the skirt 22 as shown in Fig. 1 and across the top of the hood in a manner as illustrated in Fig. 3. These score lines may also extend downwardly along the skirt although such a weakening of the hood may not be necessary. These score lines are in alignment with a tab 28 which is adapted to be grasped by the thumb and the finger of the hand so that an outward and upward pull thereon will rupture the skirt 22 of the hood along the score lines 26 and 27 and if necessary a part of the top wall 31 so that the hood may be readily removed from a position covering the end portion of the bottle. The hood may be discarded and by shaking the container the nipple 16 will assume the position shown in Fig. 4. The contents of the bottle may be properly warmed or heated prior to the removal of the hood 21 so that when the nipple 16 has been extended and arranged in the position illustrated in Fig. 4, the liquid contents may be consumed by an infant without any apprehension regarding contamination of the ingredients.

While the invention has been shown and described with reference to specific structural features, it will be appreciated that changes may be made in the details and in the general organization. Such modifications and others may be made without departing from the spirit and scope of the invention as set forth in the appended claims.

What I claim and desire to secure by Letters Patent is:

1. In a nursing device, a receptacle, a neck portion on the receptacle having an open mouth and a cylindrical outer periphery, an annular bead carried by the neck portion having an outer diameter less than the periphery of the neck, an elastic nipple including a skirt engaging said annular bead and closing the mouth of the receptacle, said nipple being inverted in the open mouth, a second annular bead on the periphery of the neck portion of a greater diameter than the cylindrical periphery, an inverted cup-shaped hood covering the mouth of the receptacle and engaging the skirt over the end of the neck portion, a skirt on the inverted cup-shaped hood lying along the cylindrical periphery and crimped about the second annular bead maintaining the hood in position over the neck portion, parallel score lines in said hood extending from the crimped edge axially along the skirt of the hood and across the inverted bottom thereof, and a pull tab providing an extension of the skirt of the hood between said score lines.

2. In a nursing device, a receptacle, a neck portion on the receptacle having an open mouth and a cylindrical outer periphery, an annular bead carried by the neck having an outside diameter less than the outer periphery of the neck, an elastic nipple including a skirt engaging said annular bead and closing the mouth of the receptacle, said neck terminating in an arcuate edge, said nipple being inverted in the open mouth with a portion of the skirt lying over said arcuate edge, a second annular bead extending outwardly from the cylindrical periphery of said neck portion, an inverted cup-shaped hood covering the neck portion of the receptacle and engaging the skirt of the nipple over said arcuate edge, a skirt forming a part of the inverted cup-shaped hood crimped about the second annular bead holding the hood in position over the neck portion, parallel score lines in said hood extending from one edge thereof axially along the skirt of the hood and across the inverted bottom thereof, and a pull tab providing an extension of the skirt of the hood between said score lines.

MABERT G. HOFFMAN.

REFERENCES CITED

The following references are of record in the file of this patent:

UNITED STATES PATENTS

| Number | Name | Date |
|---|---|---|
| 1,052,382 | Schmitt | Feb. 4, 1913 |
| 1,649,580 | Geisler | Nov. 15, 1927 |
| 2,432,496 | Beason | Dec. 16, 1947 |
| 2,434,611 | Hamiel | Jan. 13, 1948 |